(12) United States Patent
Mackie et al.

(10) Patent No.: US 8,778,252 B2
(45) Date of Patent: Jul. 15, 2014

(54) THREE-DIMENSIONAL PRINTING SYSTEM USING DUAL ROTATION AXES

(75) Inventors: Thomas R. Mackie, Verona, WI (US); Nathan James Patterson, Fitchburg, WI (US); Benjamin L. Cox, Fitchburg, WI (US); Nathan D. Schumacher, Madison, WI (US); George Wicks Petry, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 321 days.

(21) Appl. No.: 13/355,400

(22) Filed: Jan. 20, 2012

(65) Prior Publication Data
US 2013/0189435 A1 Jul. 25, 2013

(51) Int. Cl.
*B29C 67/00* (2006.01)

(52) U.S. Cl.
USPC .............................. 264/308; 425/375; 425/385

(58) Field of Classification Search
USPC ..................................... 264/308; 425/375, 385
See application file for complete search history.

(56) References Cited

U.S. PATENT DOCUMENTS

| 8,226,395 B2 * | 7/2012 | Pax et al. .................... 425/174.4 |
| 2001/0035886 A1 | 11/2001 | Bradshaw et al. |
| 2008/0042321 A1 | 2/2008 | Russell et al. |

* cited by examiner

*Primary Examiner* — James Sanders
(74) *Attorney, Agent, or Firm* — Boyle Fredrickson, S.C.

(57) ABSTRACT

A 3-D printer system moves a printed tool over a print surface with a mechanism controlling a rotational angle of an arm holding the print tool and a revolutionary angle of axis of rotation of the printable area to eliminate the disadvantages of conventionally used linear motion mechanisms.

18 Claims, 4 Drawing Sheets

THREE-DIMENSIONAL PRINTING SYSTEM USING DUAL ROTATION AXES

BACKGROUND OF THE INVENTION

Three-dimensional (3-D) printing (also known as additive manufacturing or rapid prototyping) allows for the production of three-dimensional objects by building up a material on a layer-by-layer basis. One common 3-D printer employs a printhead extruding material and movable in three Cartesian axes (x, y, z) with respect to a print surface. Under the control of a computer, the printhead moves through a series of positions over the printing surface and at each location deposits a small volume of material to define a portion of the printed object at that location. After a base layer is printed directly on the printing surface, the printhead is successively elevated (z-axis) to print additional layers on top of the base layer and then each succeeding layer until the entire object is printed.

At least one of the printhead or print surfaces is typically supported on an x-y carriage having ways extending along one axis (e.g. the x-axis) that support a movable carriage with ways extending along the perpendicular axes (e.g. the y-axis). The position of the carriage along the first set of ways and the position of the printhead along the second set of ways is typically controlled by electric motors (stepping motors and/or DC servo motors) operating through lead screws, belts, or the like.

Fabrication of precision linear ways and the drive mechanism associated with the ways can be costly or difficult, particularly for large or very small systems. Further the fabrication process is normally slow, limited by the speed at which a single carriage holding one or more printheads can be maneuvered within the framework of the ways.

SUMMARY OF THE INVENTION

The present invention provides a non-Cartesian mechanism for 3-D printing in which motion between the printhead and print surface is defined by two elements that move relatively only in rotation. The fabrication of rotating elements can be simpler than the fabrication of precision linear elements, employing relatively common rotational bearings without the need for extremely flat and rigid ways. The architecture of the present invention further facilitates the movement of multiple printheads independently over the printing surface without interference, providing the potential for higher throughput.

Specifically, the present invention provides 3-D printing system having a tool movement assembly with an arm extending radially from a first axis to a printhead location. The arm is movable relative to a printing surface to: (a) rotate about the first axis to move the printhead location in an arc over the printing surface; (b) translate relative to the printing surface along the first axis to move the printhead location to different displacements from the printing surface; and (c) revolve relative to the printing surface about a second axis displaced from the first axis and generally parallel thereto. An actuator system independently controls the rotation, translation, and revolution according to control signals and a printhead attached to the arm at the printhead location receives control signals to direct a printed volume of material toward the printing surface.

It is thus a feature of at least one embodiment of the invention to provide an extremely simple architecture for a 3-D printer that eliminates the complexity and cost of multiple linear ways and drives. Only a single linear guide is required to translate the printhead in elevation with respect to the printing surface.

The arm may extend radially from the first axis to at least two printhead locations and the 3-D printing system may further include printheads attached to the arm at each printhead location and each receiving control signals to direct a printed volume of material toward the printing surface. In one embodiment at least two printing locations may be displaced circumferentially about the first axis.

It is thus a feature of at least one embodiment of the invention to provide an increased throughput for the manufacture of three-dimensional objects by employing multiple printheads onto a single arm.

The number of printheads displaced circumferentially about the first axis on the first arm at a given circumference may increase as a function of how close the circumference is to the first axis.

It is thus a feature of at least one embodiment of the invention to match the number of printheads at each location over the support surface to the area of the support surface that will be serviced by the printheads according to the geometry of the 3-D printer.

The arc of a printhead may intersect the second axis.

It is thus a feature of at least one embodiment of the invention to permit complete coverage of the printing surface with a single printhead and combinations of rotation and revolution.

The 3-D printing system may further include a second arm extending radially from a third axis displaced from the second axis, the second arm extending to a printhead location and holding a second printhead and operating analogously to the first arm.

It is thus a feature of at least one embodiment of the invention to provide a 3-D printer that may allow multiple independent printheads movement over the print surface with reduced interference.

The second arc of the second arm may not intersect the axis of the printing surface.

It is thus a feature of at least one embodiment of the invention to mechanically reduce collision areas between the arms.

The tool movement assembly may include a platform defining on its upper surface the printable area and rotatable about the second axis as supported on a bearing assembly attached to a framework, and the arm may be supported by a column rotatable about the first axis as supported on a bearing assembly attached to the framework and whereby the arm revolves relative to the printing surface by rotation of the platform.

It is thus a feature of at least one embodiment of the invention to provide a simple mechanism for realizing the rotational and revolutionary movement of the present invention.

The 3-D printing system may further include a second platform defining on its upper surface a second printable area and rotatable about a third axis as supported on a bearing assembly attached to a framework and wherein the arm is adapted to revolve relative to first and second printing surface in an arc extending over the first and second printing surfaces.

It is thus a feature of at least one embodiment of the invention to provide better utilization of a print head that may be shared among different simultaneously fabricated objects The 3-D printing system may include a second arm selected from the group consisting of: a curing element, a material removal element, and a material support element.

It is thus a feature of at least one embodiment of the invention to provide a system that permits multiple tools that may interact for fabrication and provide either additive or subtractive manufacture.

The actuator system may comprise only two motors selected from the group consisting of stepping motors and permanent magnet synchronous motors.

It is thus a feature of at least one embodiment of the invention to provide an extremely low-cost 3-D printing system requiring only two motors. It is thus a feature of at least one embodiment of the invention to provide a system that may work flexibly with different motor types.

The 3-D printing system may further include an electronic computer programmed to receive a three-dimensional description of an object to be fabricated in the form of a file providing locations identified in three Cartesian coordinates and providing control signals to the actuator system and the printhead to control the rotation, translation, revolution and printing to reproduce the object with or without support material for the object on the printing surface using the printhead.

It is thus a feature of at least one embodiment of the invention to provide a system for translating conventional CAD files into the coordinate structure of the present invention.

The printhead may extrude a fluid material. In one example, the fluid material may be heated thermoplastic material. In another example the fluid may be metal or solder heated by a welding system such as a TIG welder, or heater.

It is thus a feature of at least one embodiment of the invention to provide a system that may work with conventional 3-D printheads.

It is a feature of at least one embodiment to enable 3D scanning of objects placed on the turntable. This is made possible by viewing the object with one or more sensors attached to the printing arm of the device.

These particular objects and advantages may apply to only some embodiments falling within the claims and thus do not define the scope of the invention.

DETAILED DESCRIPTION OF THE PREFERRED EMBODIMENT

Figure 1:
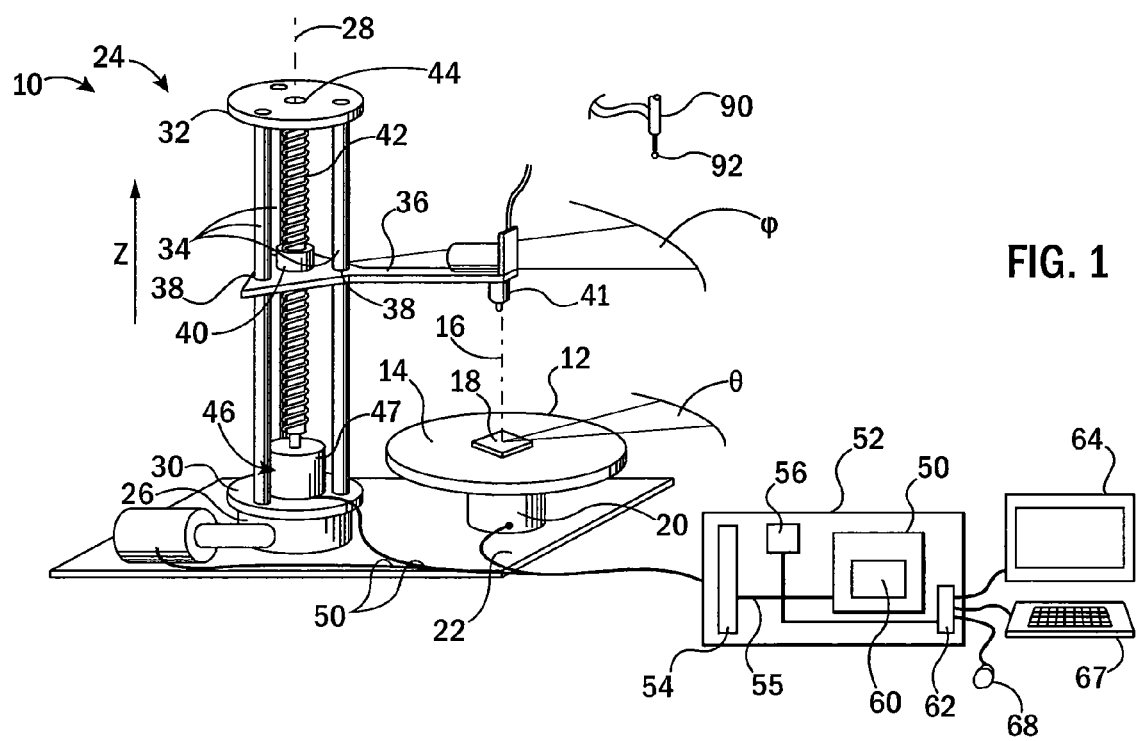
FIG. 1 is a perspective view of one embodiment of the present invention showing a platform for supporting a printed object for rotation about a first axis positioned next to a tool column moving a printhead on an arm cantilevered over the platform, the tool column rotatable about a second axis and the arm elevated, all under the control of an electronic computer executing a stored program.

Referring now to FIG. 1, a 3-D printer 10 according to one embodiment of the present invention may provide an object platform 12 presenting a substantially upwardly facing horizontal planar surface 14. The surface 14 provides a printing area on which an object 18 may be printed and is rotatable about a vertical axis 16 indicated by angle θ.

The object platform 12 is supported on a rotary drive 20 allowing position-controlled rotation of the object platform 12 about the axis 16 under computer control. The rotary drive 20 may include, for example, bearings supporting the object platform 12 for rotation about the vertical axis 16 and a motor system, for example, a stepper motor or permanent magnet DC motor and encoder, providing for positioning. When a stepper motor is used, micro-stepping control may be implemented providing an accuracy of more than 1000 steps per revolution with direct drive. Alternatively or in addition, a gear train may be used to connect the motor to the platform 12 for added or increased resolution. In a simple embodiment the object platform 12 may be mounted directly on the shaft of the motor so that the bearings of the motor provide the necessary support for the object platform 12. In a simple embodiment, the platform 12 may be attached directly to the drive shaft of the motor.

The rotary drive 20 may be supported by an attached frame 22 holding the object platform 12 in fixed relationship adjacent to tool column 24 also attached to the frame 22 via rotary drive 26. The rotary drive 26, like the drive 20 may provide for controlled revolution of the tool column 24 about an axis 28 indicated by angle φ. The axis 28 is generally parallel to axis 16 and displaced laterally therefrom. The rotary drive 26 may be functionally comparable to the rotary drive 20 providing angular positioning under computer control.

The rotary drive 26 may rotate a base plate 30 of the tool column 24, the base plate 30 rigidly connected to a vertically opposed top plate 32 via three cylindrical ways 34 extending vertically between the base plate 30 and top plate 32 and spaced equally about the axis 28. A horizontally extending tool support arm 36 may be supported on the cylindrical ways 34 by means of sliding bearings 38 positioned about each of the ways 34 so that the tool support arm 36 may move up and down in elevation (z-axis) while maintaining a horizontal orientation and rotating with the base plate 30 and top plate 32. A portion of the tool support arm 36 centered between the ways 34 may hold an internally threaded collar 40 receiving a vertically oriented threaded rod 42. The threaded rod 42 may be attached at its upper end to the top plate 32 through a rotary bearing 44 and at its bottom end to a rotary drive 46, the latter attached to rotate with the base plate 30. Rotation of the rotary drive 46 will cause rotation of the threaded rod 42 controlling elevation of the tool support arm 36 along the-z-axis by a distance z.

In a simple embodiment, the rotary drive 46 may be a motor 47 attached to top of the base plate 30 with its shaft extending vertically upward along axis 28 and attached to the lower end of the threaded rod 42 by a rotary coupling. The motor 47 of the rotary drive 46, like the rotary drives 20 and 26, may be a stepper motor or other position-controllable motor system for angular position control of the threaded rod 42.

A portion of the tool support arm 36 extends in cantilever over the object platform 12 and supports a printhead 41 directed toward the object platform 12. A printhead 41, for example, may be an electronically controllable extruder extruding melted thermoplastic through a nozzle having an orifice, for example, as commercially available from Maker-Bot® Industries of Brooklyn, N.Y., under the tradename Stepstruder®. Such printheads 41 include a resistor (or similar heating element, such as a cartridge heater or resistive wire), heater nozzle and stepper motors for feeding thermoplastic rods into the heater to provide controlled extrusion of a predetermined volume of molten thermoplastic according to received command signals.

It will further be appreciated that other kinds of printheads 41 may be used as are understood in the art, including those that deposit materials other than thermoplastic (for example, inks, paints, resists, or the like) including not only those that harden or solidify by cooling, but also those that harden by chemical reaction (for example with two-part epoxies or other polymers) or by solvent evaporation or absorption, or that do not harden appreciably, for example, a printhead 41 extruding a paste or frosting. The printhead 41 may further include those that deposit particulate solid materials, for example, metal beads that may be thermally fused by a laser beam or the like.

Each of the rotary drives 20, 26, and 46, and the printhead 41, may communicate through cabling 50 with an electronic computer 52 having an interface circuit 54, for example, providing micro-stepping control stepper motors or feedback control of the DC servo motor using signals from an associated encoder and providing the necessary control signals to the printhead 41. The rotation of the rotary drives 20, 26, and 46 can either be synchronous or asynchronous, in the same direction or different directions and at different or the same angular velocities. The interface circuit 54 may communicate via an internal bus 55 with a processor 56 and a memory 58, the latter holding a stored program 60 operating the printer 10 as will be described below. Generally, the internal bus 55 may also connect with an operator interface 62 communicating with a graphics display screen 64, a keyboard 67, and a mouse 68 or the like, for receiving input from a user and providing output to the user.

Figure 2:
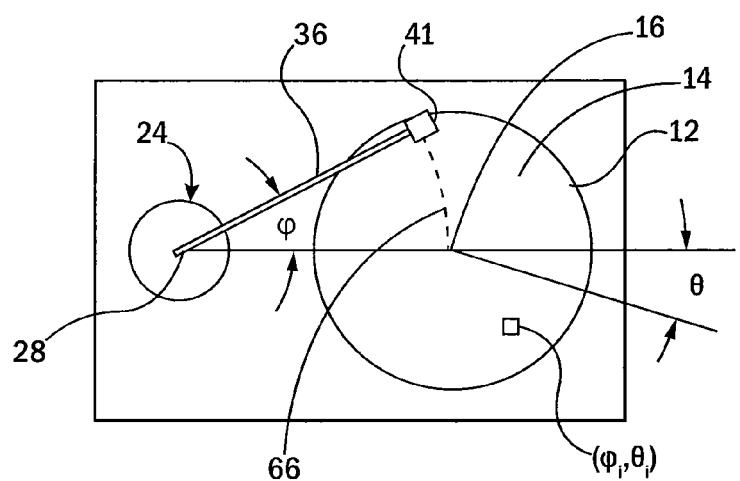
FIG. 2 is a simplified top plan view of the system of FIG. 1 showing two angular coordinates used for controlling the printhead in an arcuate path over the print surface and rotation of the print surface.

Referring now to FIG. 2, the axis 28 may be positioned with respect to the axis 16 and the length of the cantilevered portion of the tool support arm 36 so that the printhead 41 may trace an arc 66 over the object platform 12, the arc 66 extending from one edge of the object platform 12 to its center defined by axis 16. The combined motion of the tool column 24 in angle φ and the object platform 12 in angle θ is therefore sufficient to position the printhead 41 at any location over the object platform 12 defined by a unique value of (φ, θ). The 3-D printer 10 can therefore provide precise positioning of the printhead 41 in the horizontal plane without complexity of multiple linear ways and drives associated with a standard x-y table. The 3-D printer 10 further reduces the necessary the linear ways and drives to one (used for the z-axis) as opposed to three in a conventional 3-D printer design. It will further be appreciated that the area printing area on which the printed object 18 may be fabricated extends over the entire surface of the object platform 12 and is not bounded by structure of the 3-D printer 10 as would be the case with the conventional x-y-z or Cartesian tool support.

Figures 3, 4:
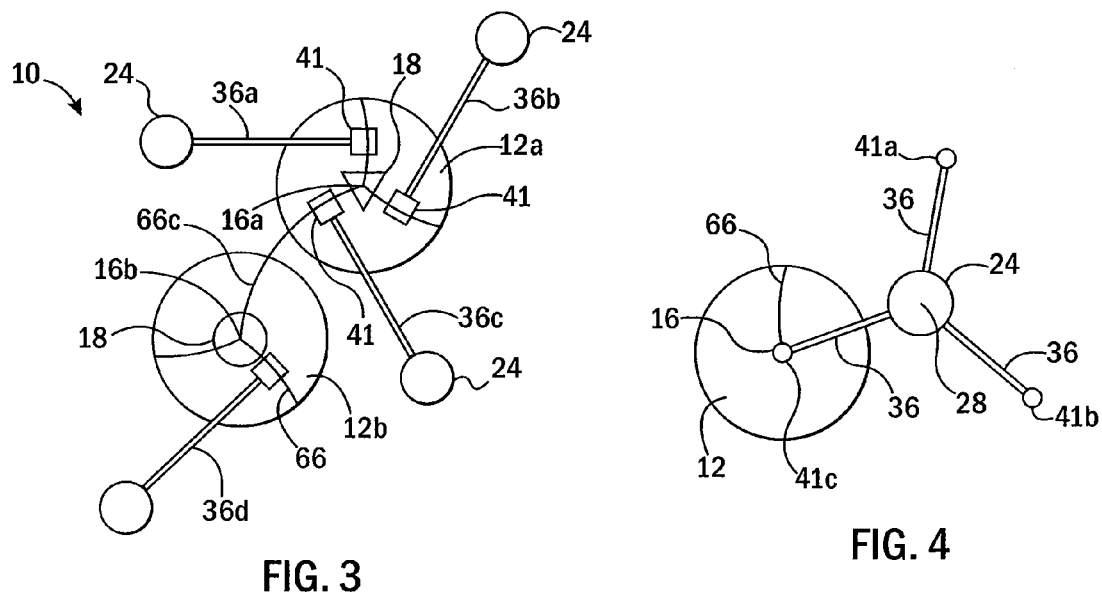
FIG. 3 is a figure similar to that of FIG. 2 showing an embodiment with multiple rotating platforms and multiple independent arms that may operate with limited interference.
FIG. 4 is a figure similar to that of FIGS. 2 and 3 showing an embodiment with multiple interdependent arms for changing tools.

Referring now to FIG. 3, the architecture of the 3-D printer 10 permits the use of multiple tool arms 36a-36c, each associated with a different independently controllable tool column 24, to be simultaneously in use on a single object platform 12a with minimal interference. Separate printheads 41 associated with the arms 36a-36c may move independently over the platform 12a to print different portions of an object, for example with different extruded materials.

Likewise, a printhead 41 of a single tool support arm 36c, for example, may be positionable over multiple platforms 12a and 12b associated with different parallel axes 16a and 16b along the arc 66c of the printhead 41. This configuration allows the use of a printhead 41 associated with a lightly used material (for example a spacer material) to be efficiently used for fabrication of multiple different objects 18.

When multiple arms 36 are used, the printheads 41 on some arms 36d, for example, may be positioned to describe an arc 66 that does not intersect the axis 16a which may be reached by another printhead 41. This configuration reduces interference between the printheads 41 at this center position of the object platform 12.

Referring now to FIG. 4, it will be further understood that a single tool column 24 and tool support arm 36 may provide for multiple separate cantilevered portions, in this case extending radially outward at equal angles about the axis 28 from a common elevation, each cantilevered portion holding a different printhead 41a-40c. In this configuration, selection between different printheads 41 and, for example, associated different materials, may be made simply by control of the angle φ of the tool column 24 to move the different printheads 41 into position over the platform 12. Notably, this selection can be performed without the need for additional drive mechanisms reducing the implementing cost of using multiple printheads or other tools.

Figures 5, 6:
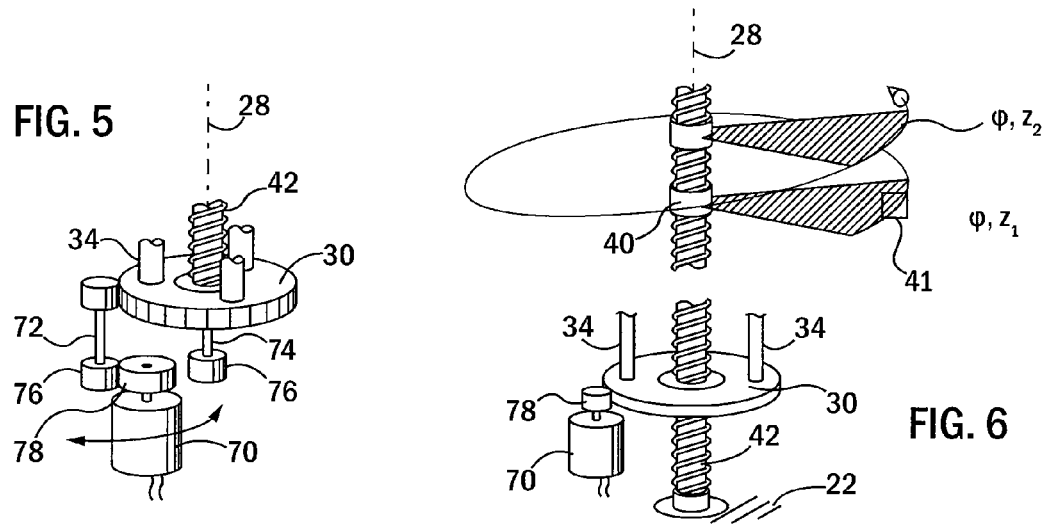
FIG. 5 is a fragmentary perspective view of an embodiment of the tool column of FIG. 1 allowing rotation and elevation control with a single movable motor.
FIG. 6 is a figure similar to that of FIG. 5 showing single motor control of elevation and rotation of the arm in an alternative embodiment.

Referring now to FIG. 5, a reduction in the number of necessary motors needed in the 3-D printer 10 may be achieved by using a single motor 70 providing for the function of both the rotary drives 26 and 46. Specifically, a single motor 70 may be shared between a first drive mechanism 72 turning the base plate 30 and a second drive mechanism 74 turning the threaded rod 42, for example, each of the drives 72 and 74 having a spur gear 76 that may alternately engage the corresponding spur gear 78 on the motor 70, the latter as moved by a solenoid or the like. Because the movement of the threaded rod 42 is relatively infrequent (only between layers), such sharing is practical.

Referring now to FIG. 6, an alternative sharing technique, the threaded rod 42 may be fixed to the frame 22 so that rotation of the base plate 30, for example, by a motor 70 simultaneously changes the height of the threaded collar 40 on the threaded rod 42 and the angle of the tool column 24 and hence the tool support arm 36. In this case, incrementing of the printhead 41 along the z-axis may be performed by rotation of the base plate 30 by an integer multiple of 360 degrees causing the threaded collar 40 to rise to a next level (z1 to z2). In this case, movement in the φ angle causes some commensurate movement along z which may be minimized by a low pitch of the thread of threaded rod 42.

Figure 7:
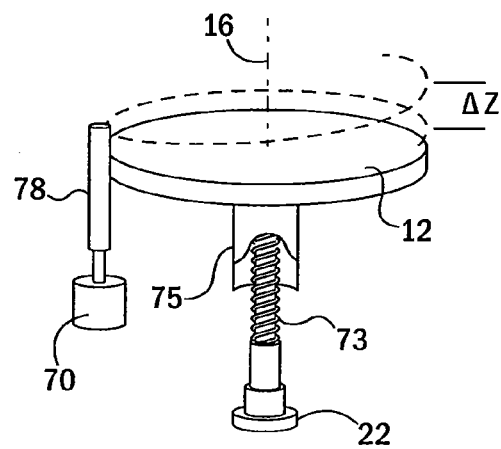
FIG. 7 is a fragmentary view similar to that of FIG. 6 showing implementation of an elevational control using the motion of the rotating platform rather than the tool column.

Referring now to FIG. 7, an alternative method for reducing the number of required motors links the z and θ axes (instead of the z and φ axes as described with respect to FIGS.

5 and 6) by having rotation of the object platform 12, for example, by a motor 70 also cause a change in elevation of the platform along the z-axis. This may be effected, for example, by an upwardly extending threaded rod 73 fixed with respect to the frame 22 received within a corresponding threaded collar 75 attached to the bottom of the object platform 12. Rotation of the object platform 12 may be had by the engagement of the gear 78 of the motor 70 with gear teeth along the periphery of the rotary platform 12 to rotate the platform. Rotation of the object platform 12 changes the angle θ and also elevates or drops the height of the object platform 12 along the z-axis by the engagement of the threaded rod 73 and collar 75. During use of the 3-D printer 10 for printing a given layer, the object platform 12 rotation is restricted to a given 360 degree. Changes in layer height (z-axis) are achieved by an integer multiple of 360 degrees of rotation. The interaction between z and θ again provides a slight helical offset to layers of the printed object 18 which can be reduced by using a fine pitch of the threads of the rod 73 and collar 75.

It will be understood that all of the motions described herein, including motion in z, φ and θ are relative motion between the object platform 12 and the tool column 24.

Figure 8:
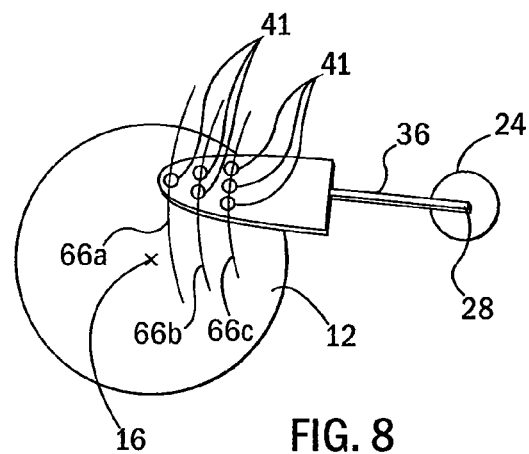
FIG. 8 is a figure similar to that of FIG. 2 showing incorporation of multiple printheads onto a single arm with a radial and circumferential offset between printheads and the number of printheads along each arc portion matching a radial distance of the arc from the center of rotation of the arm.

Referring now to FIG. 8, increased throughput may be provided by adding multiple printheads 41 onto the tool support arm 36 at different arcs 66a-66c from the axis 28 which may allow opportunistic simultaneous ejection of material through multiple printheads 41. As well as displacing the printheads 41 along different arc 66, the printheads may be disbursed circumferentially along a given arc 66 to similar effect. Generally additional circumferentially spaced printheads 41 may be used for smaller arcs (e.g. arc 66c) reflecting the fact that these printheads cover the respective greater area of the object platform 12.

Figure 9:
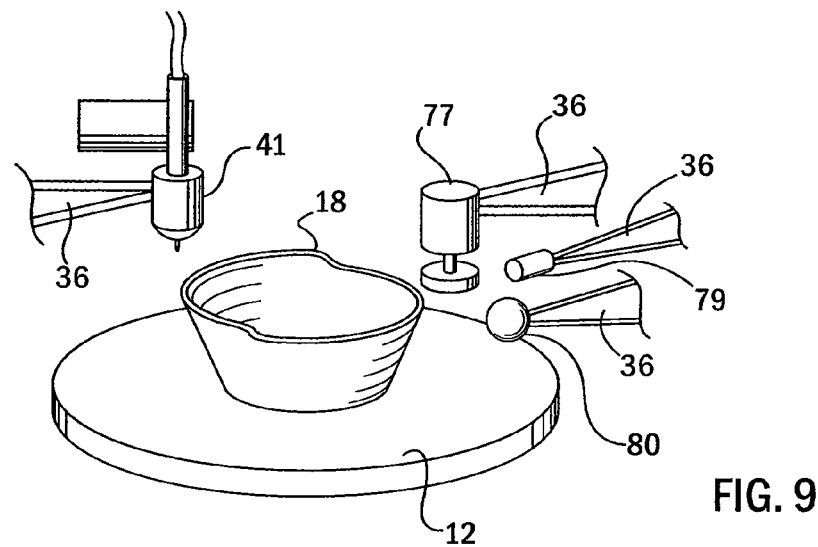
FIG. 9 is a perspective view of the printing platform showing additional arms that may be used for subtractive machining, material support and material curing.

Referring now to FIG. 9 different tool arms 36 may be associated not only with printheads 41 but also other tools that may be used for fabrication including, for example, a grinding tool 77 allowing for subtractive manufacturing or surface finishing. Such a subtractive process is particularly useful for rotationally symmetric items that may be conventionally produced on a lathe and which are well adapted to the present invention. Alternatively the tool support arm 36 may hold a UV curing lamp 79 that may operate in conjunction with a printhead 41 dispensing a light-curing polymer. Alternatively the tool support arm 36 may hold a shaping tool 80, for example, used to support or shape molten or solidified material ejected from the printhead 41, for example, instead of a substrate layer when an overhang must be created.

Figure 10:
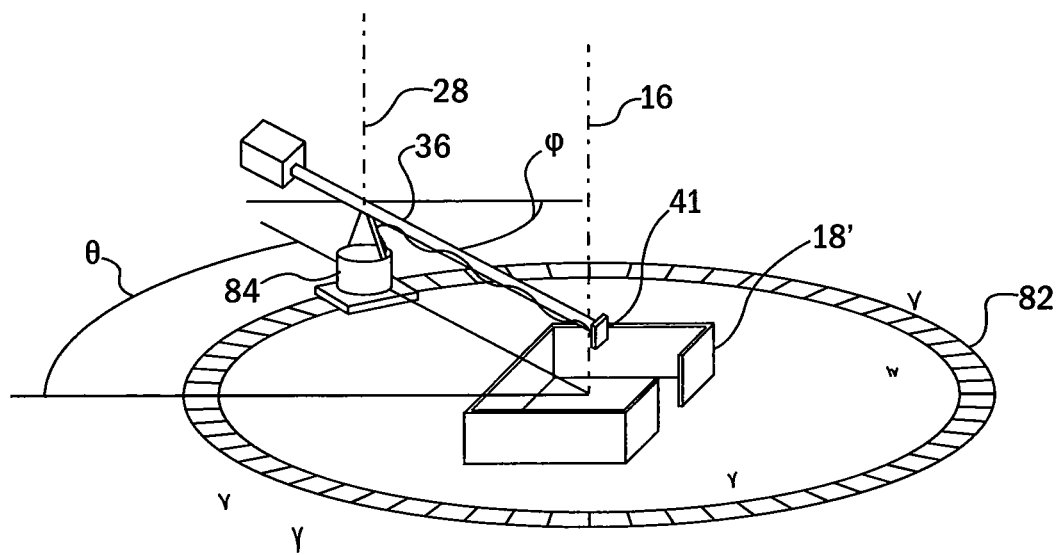
FIG. 10 is a perspective view of an embodiment of the invention intended for extremely large-scale construction in which effective rotation of the printed object is obtained by movement of the support for the tool column.

Referring now to FIG. 10, as noted above, the necessary motion of the present invention is only relative motion between the printed object 18 and the printhead 41 and need not require rotatable object platform 12. This can be particularly important for extremely large printing projects, for example, printing walls for building 18' out of concrete or the like extruded from the printhead 41. In this case the necessary revolution of the axis 28 of the tool support arm 36 about the printed object 18 may be provided by mounting the tool support arm 36 and the tool column 24 on a circular track 82 surrounding the printed object 18 by movement of a carriage 84 on the track 82 to which the tool column 24 is attached. In this way, the necessary revolution angle θ may be obtained without the need to rotate the building 18' about the axis 16 relative to the earth. A conventional pivoting structure on the tool column 24 provides for the revolution angle φ.

Figure 11:
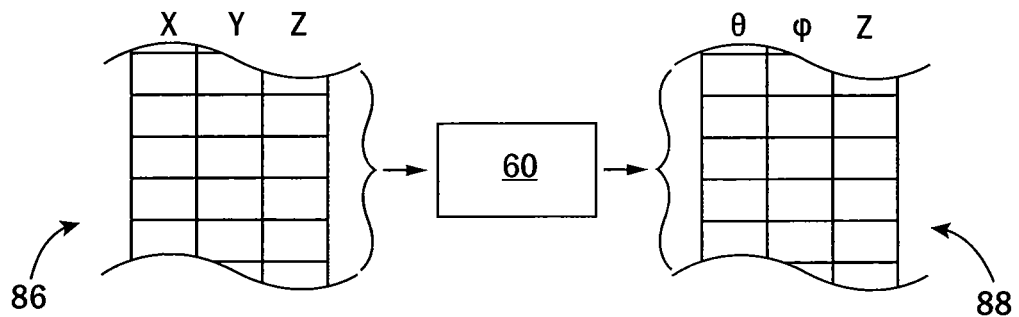
FIG. 11 is a process diagram of a program executable by the computer of FIG. 1.

Referring now to FIG. 11, conventional CAD programs typically provide for a definition of a three-dimensional object in a data file 86 providing three Cartesian coordinates of x, y, and z for each volume element of the object. The program 60 of the present invention may therefore provide a translation of these coordinates of the data file 86 into a new set of coordinates in a data file 88 commensurate with the 3-D printer 10 of the present invention of revolution angle θ, rotation angle φ and elevational positions z allowing the present invention to work with conventional tools for computer aided machining and computer aided design. It will be appreciated that the motors may be any type of motor that can provide for controllable revolutions including stepper motors, permanent magnet DC motors, piezoelectric motors and the like.

Referring again to FIG. 1, the printhead 41 may be replaced with or used in conjunction with a scanning head 90 to provide for 3-D scanning. The scanning head 90 may be, for example, a contact scanning head having a stylus 92 where the scanning head 90 may detect a touching of the stylus 92 to a three-dimensional model (not shown) for scanning the same. The model may be placed upon the surface 14 of the platform 12 and affixed thereto to rotate with rotation of the platform 12. The stylus 92 may be touched against the surface of the model at various z-axis heights and θ rotations of the model on the platform 12 as the stylus 92 is moved radially inward and outward by movements of the arm 36 to develop a "point cloud" describing the surface of the model. This point cloud may then be converted to a polygon mesh model or a surface model employing polynomial splines or the like describing the surface of the model, this data then manipulated to produce the necessary commands to generate a printed replica of the model using the printhead 41. In this regard, the use of the same geometry for the printer and the scanner may simplify the conversion between the scanned data and data needed to control the printhead 41. The angular orientation of the stylus 92 may be changed to accommodate different model types or may be under control of the electronic computer 52 using a positionable servomotor or the like, to assist in characterizing concave surfaces.

Other types of scanning heads 90, including optical triangulation type heads triangulating a projected beam of light with a pattern or unique focus point to identify surface point locations; silhouette scanners using a camera to measure the silhouette of the model from multiple angles to reconstruct a convex hull using backprojection, or cameras deducing depth of surface points from lighting cues such as shadows or focus may also be used.

Figure 12:
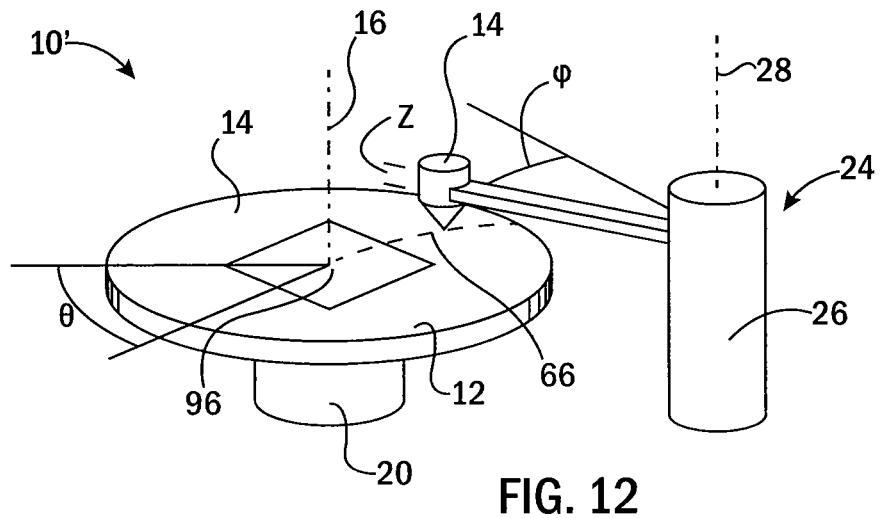
FIG. 12 is a figure similar to FIG. 1 of an alternative embodiment of the invention eliminating continuous z-axis adjustability.

Referring now to FIG. 12, in one embodiment, the tool column 24 may be limited in motion to angle φ only without the capability of z-axis motion, providing a greatly simplified system that permits two-dimensional or shallow three-dimensional printing, for example, printing of a generally planar upper surface of a printed circuit board 96 attached to the upper surface 14 of the rotating platform 12. Such a printing system 10' can be useful for applying a relatively thick layer of resist or conductive ink or etching liquid on a printed circuit board or the like, but could be used for any substantially two-dimensional printing requirement. In this case the printhead 14 may be stationary in the z-axis or may provide for a limited z-axis motion, typically, being positionable between two z-axis positions by a mechanism within the printhead 14, for example using a solenoid or the like, to be positioned in either a printing or retracted position. An ability to move between two closely spaced z-axis positions allows relatively thick printing layers to be deposited for decorative or functional reasons when the printed material has a z-axis height.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A 3-D printing system comprising;
a tool movement assembly having an arm extending radially from a first axis to a printhead location, the arm movable relative to a printing surface to:
(a) rotate about the first axis to move the printhead location in an arc over the printing surface;
(b) translate relative to the printing surface along the first axis to move the printhead location to different displacements from the printing surface; and
(c) revolve relative to the printing surface about a second axis displaced from the first axis and generally parallel thereto;
an actuator system independently controlling the rotation, translation, and revolution according to control signals;
a printhead attached to the arm at the printhead location receiving control signals to direct a printed volume of material toward the printing surface.

2. The 3-D printing system of claim 1 wherein the arm extends radially from the first axis to at least two printhead locations and further including printheads attached at the aim at each printhead location and each receiving control signals to direct a printed volume of material toward the printing surface.

3. The 3-D printing system of claim 2 wherein at least two printing locations are displaced circumferentially about the first axis.

4. The 3-D printing system of claim 3 wherein a number of printheads displaced circumferentially about the first axis on the first arm at a given circumference increases as a function of how close the circumference is to the first axis.

5. The 3-D printing system of claim 1 wherein the arc intersects the second axis.

6. The 3-D printing system of claim 1 including a second arm extending radially from a third axis to a printhead location, the second arm movable relative to the printing surface to:
(a) rotate about he third axis to move the printhead location in a second arc over the printing surface;
(b) translate relative to the printing surface along the third axis to move the printhead location to different displacements from the printing surface;
(c) revolve relative to the printing surface about the second axis displaced from the third axis and generally parallel thereto;
a second printhead attached to the second arm at the printhead location and receiving control signals to direct a printed volume of material toward the printing surface; and
wherein the actuator system independently controls the rotation, translation and revolution of the second arm according to the control signals.

7. The 3-D printing system of claim 6 wherein the second arc does not intersect the second axis.

8. The 3-D printing system of claim 1 wherein the tool movement assembly includes a rotatable platform defining on its upper surface the printing surface and rotatable about the second axis as supported on a bearing assembly attached to a framework and wherein the arm is supported by a column rotatable about the first axis as supported on a bearing assembly attached to the framework and whereby the arm revolves relative to the printing surface by rotation of the column.

9. The 3-D printing system of claim 8 further including a second arm extending radially from a third axis to a printhead location, the second arm movable to:
(a) rotate about the third axis to move the printhead location in a second arc over the printing surface;
(b) translate relative to the printing surface along the third axis to move the printhead location to different displacements from the printing surface;
(c) revolve relative to the printing surface about the second axis displaced from the third axis and generally parallel thereto;
wherein the second arm is supported by a second column rotatable about a third axis as supported on a bearing assembly attached to the framework and wherein the second arm revolves relative to the printing surface by rotation of the second column.

10. The 3-D printing system of claim 8 further including a second platform defining on its upper surface a second printable area and rotatable about a third axis as supported on a bearing assembly attached to the framework and wherein the arm is adapted to revolve relative to first and second printing surface and to rotate the printhead position in an arc extending over the first and second printing surfaces.

11. The 3-D printing system of claim 1 including a second arm extending radially from a third axis to a printhead location, the second aim movable to:

(a) rotate about the third axis to move a tool location in a second are over the printing surface;
(b) translate relative to the printing surface along the third axis to move the tool location to different displacements from the printing surface;
(c) revolve relative to the printing surface about the second axis displaced from the third axis and generally parallel thereto;
a tool attached to the arm of the second arm at the tool location wherein the tool is selected from the group consisting of: a curing element, a material removal element, and a material support element; and
wherein the actuator system is adapted to independently control the rotation, translation, and revolution of the second arm according to control signals.

12. The 3-D printing system of claim 1 wherein the actuator system comprises only two motors for moving the arm relative to the printing surface in the rotation, translation and revolution, the motors selected from the group consisting of stepping motors and permanent magnet synchronous motors.

13. The 3-D printing system of claim 1 further including an electronic computer executing a stored program fixed in non-transient media to receive a three dimensional description of an object to he fabricated comprised of a file providing locations identified in three Cartesian coordinates and providing control signals to the actuator system and the printhead to control the rotation, translation, revolution and printing to reproduce the object on the printing surface using the printhead.

14. The 3-D printing system of claim 1 wherein the printhead is adapted to extrude a fluid material.

15. The 3-D printing system of claim 14 wherein the fluid material, is heated thermoplastic material.

16. A method of fabricating a three-dimensional object using a 3-D printing system comprising:
a tool movement assembly having an arm extending radially from a first axis to a printhead location, the arm movable to:
rotate about the first axis to move the printhead location in an arc over a printing surface:
translate relative to the printing surface along the first axis to move the printhead location to different displacements from the printing surface;
revolve relative to the printing surface about a second axis displaced from the first axis and generally parallel thereto;
an actuator system independently controlling the rotation, translation, and revolution according to control signals;
a printhead attached to the arm at the printhead location receiving control signals to direct a printed volume of material toward the printing surface;
the method comprising the steps of:
(a) rotating and revolving the arm to a location according to a predefined electronically readable instruction set; and
(b) at the location, activating the printhead to discharge a volume of material toward the printing surface;
(c) repeating steps (a) and (b) for instructions of the electronically readable instruction set for a given height of the arm away from the printing surface, and at a conclusion of that level translate the arm away from the printed surface by a height substantially equal to a height of the volume of material.

17. The method of claim 16 further including the steps of receiving an electronic file providing locations identified by three Cartesian coordinates describing a three-dimensional object to be printed and converting the Cartesian coordinates into coordinates in the rotation, revolution, and translation axes of freedom of the 3-D printing system.

18. A 3-D printing system comprising:
a platform having an upper surface rotatable about an axis for supporting a printed object;
a tool movement assembly positioned adjacent to the rotatable platform and providing an arm extending in cantilever from the rotatable tool movement assembly over the platform, the arm having an end movable in an arc extending from a point vertically aligned with a center of rotation of the rotatable platform to an edge of the platform;
a material printer attached to the end of the arm to discharge material therefrom;
a support frame communicating with the platform and tool movement assembly to move the arm vertically with respect to the platform; and
an actuator system receiving electrical signals to independently control rotation of the platform with respect to the support frame, movement of the arm in the arc with respect to the, support frame, and movement of the arm vertically with respect to the platform.

* * * * *

UNITED STATES PATENT AND TRADEMARK OFFICE
CERTIFICATE OF CORRECTION

PATENT NO. : 8,778,252 B2  
APPLICATION NO. : 13/355400  
DATED : July 15, 2014  
INVENTOR(S) : Thomas R. Mackie Page 1 of 1

It is certified that error appears in the above-identified patent and that said Letters Patent is hereby corrected as shown below:

IN THE CLAIMS

| | |
|---|---|
| CLAIM 2 | Delete "aim" and substitute therefor |
| Col. 9, Line 67 | --arm-- |
| | |
| CLAIM 11 | Delete "aim" and substitute therefor |
| Col. 10, Line 67 | --arm-- |

Signed and Sealed this  
Seventh Day of October, 2014

Michelle K. Lee  
*Deputy Director of the United States Patent and Trademark Office*